United States Patent [19]

Sarten

[11] Patent Number: 5,070,857
[45] Date of Patent: Dec. 10, 1991

[54] CONVERTIBLE FOOD PREPARATION/HOLDING APPARATUS

[76] Inventor: Stephen O. Sarten, Box 116, Clinton, Ky. 42031

[21] Appl. No.: 613,250

[22] Filed: Nov. 14, 1990

[51] Int. Cl.⁵ .............................................. F24B 3/00
[52] U.S. Cl. .............................. 126/25 R; 126/25 A; 126/41 R; 126/9 R
[58] Field of Search ............... 126/41 R, 25 R, 25 A, 126/9 R

[56] References Cited

U.S. PATENT DOCUMENTS

| | | | |
|---|---|---|---|
| 2,607,334 | 8/1952 | Perlman | 126/9 |
| 2,638,888 | 5/1953 | Molla | 126/25 A |
| 3,285,239 | 11/1966 | Drake | 126/25 A |
| 3,688,757 | 9/1972 | Dusek | 126/25 A |
| 4,166,413 | 9/1979 | Meszaros | 126/25 R |
| 4,442,762 | 4/1984 | Beller . | |
| 4,572,062 | 2/1986 | Widdowson | 126/25 A |
| 4,592,335 | 6/1986 | Beller . | |

Primary Examiner—Carroll B. Dority
Attorney, Agent, or Firm—King & Schickli

[57] ABSTRACT

A convertible food preparation/holding apparatus includes an open bottom cabinet supported on legs above the ground. The cabinet is adapted to selectively receive a charcoal pan for charcoal firing and a gas burner assembly for gas firing. The apparatus also includes a hot/cold serving assembly that may be positioned in the cabinet to convert the apparatus to a hot or cold serving table. The cabinet is provided with a series of cooperating F-shaped slots in opposing sidewalls that allow the desired positioning of the charcoal pan in various cooking positions. The lower edge of the cabinet also includes an inwardly directed flange about its entire periphery. When the charcoal pan is moved to its lowermost position the pan rests on this flange cutting off air flow from beneath the cabinet.

14 Claims, 4 Drawing Sheets

CONVERTIBLE FOOD PREPARATION/HOLDING APPARATUS

TECHNICAL FIELD

The present invention relates generally to outdoor cooking devices and, more particularly, to a versatile, convertible food preparation/holding apparatus that may be utilized as a charcoal or gas grill as well as a hot/cold serving unit.

BACKGROUND OF THE INVENTION

Barbecues and cookouts continue to grow in popularity year after year. The succulent taste of such foods as hamburgers, steak, chicken, beef and pork ribs, pork chops, and even fish grilled over an open fire continues to bring people back for more. In fact, company picnics and large social gatherings centered around outdoor picnics are becoming more and more popular.

In order to serve the relatively large number of people at company picnics and such social gatherings, various large capacity outdoor cooking equipment has been developed by a number of manufacturers. These consist of, for example, four to six inch deep flat pan charcoal grills with an adjustable meat rack, six inch to eight inch deep gas fired grills with fixed meat racks and barrel type roasters either trailer mounted or on legs.

While these devices are quite effective to achieve their particular purpose, they do suffer from a lack of versatility. Accordingly, outdoor cooking equipment rental companies and catering services must purchase separate pieces of equipment so as to have a full line of products available to customers. For example, rental equipment companies would need to purchase gas grills, charcoal grills, roasters as well as hot and cold serving tables to meet the needs of all of their customers. This represents an undesirable significant capital expense.

It is, therefore, clear that a need exists for a relatively inexpensive convertible food preparation/holding apparatus that may be simply and easily converted to meet the needs of the end user.

SUMMARY OF THE INVENTION

Accordingly, it is a primary object of the present invention to provide an improved and more versatile food preparation/holding apparatus for outdoor use overcoming the above-described limitations and disadvantages of the prior art.

Another object of the present invention is to provide a relatively inexpensive yet versatile outdoor food cooking/holding apparatus readily adaptable for both gas or charcoal firing.

Still another object of the present invention is to provide an outdoor cooking apparatus with an integral side wall enclosure allowing for effective and efficient rotisserie cooking with or without a hood.

Yet another object of the present invention is t o provide a food preparation/holding apparatus convertible between a gas grill, a charcoal fired grill and a hot or cold food serving table as required by the user. An additional object of the present invention is to provide a convertible food preparation/holding apparatus allowing superior air flow to improve cooking efficiency and more effective temperature control to better allow cooking various meats to desired taste.

Still a further object of the present invention is to provide an outdoor cooking apparatus of relatively inexpensive construction that is less expensive to operate while providing an extended service life.

Yet another object of the present invention is to provide an outdoor cooking apparatus having an air space between the fire pan and outer cabinet. Accordingly, the outer cabinet remains at a cooler temperature so that the outer appearance of the cabinet remains fresher for a longer period of time. Additionally, the chances of inadvertent injury including burns from accidental contact with the cabinet are significantly reduced.

In accordance with yet another aspect of the present invention, the outdoor cooking apparatus allows one-man operation to adjust the relative fire/food position for the desired cooking rate.

Additional objects, advantages, and other novel features of the invention will be set forth in part in the description that follows and in part will become apparent to those skilled in the art upon examination of the following or may be learned with the practice of the invention. The objects and advantages of the invention may be realized and obtained by means of the instrumentalities and the combinations particularly pointed out in the appended claims.

To achieve the foregoing and other objects, and in accordance with the purposes of the present invention as described herein, an improved food preparation/holding apparatus is provided that is readily convertible between a gas burner grill, a charcoal fired grill and a hot or cold serving table to meet the needs of the user. More specifically, the apparatus includes a cabinet formed from four cooperating sidewalls. The cabinet also includes structure for selectively mounting a charcoal pan or a gas burner assembly. Thus, the apparatus includes a charcoal pan selectively mountable in the cabinet for holding charcoal and converting the apparatus to a charcoal fired grill. The apparatus further includes a gas burner assembly, interchangeable with the charcoal pan, that may be selectively positioned within the cabinet to convert the apparatus to a gas fired grill.

In accordance with a further aspect of the present invention, the apparatus includes a hot/cold serving assembly that may be selectively mounted to the apparatus. The hot/cold serving assembly converts the apparatus to a hot or cold serving table for holding and serving meats, vegetables, soups and salads as desired by the user.

More preferably, the cabinet also includes a hood for closing the top of the cabinet. The hood is selectively displaceable between an open position allowing access to the interior of the cabinet and a closed position sealing the top of the cabinet. Further, the cabinet may be mounted to a series of four legs which support the cabinet on the ground. If desired, the legs may include castors. Alternatively, the legs may be mounted to a trailer to allow towing of the apparatus behind a vehicle.

The apparatus may also include other convenience features such as a shelf which is mounted to the cabinet. When operating in the grill mode, the shelf may be used to hold seasonings, cooking utensils and/or, for example, meat to be cooked on the grill. Alternatively, when serving as a hot/cold serving table, the shelf may be utilized to hold condiments or, for example, eating utensils.

More particularly, the apparatus may also include a drip rail that is received in the cabinet and nests in an upper lip thereof. Preferably, the drip rail extends inwardly from the sidewalls of the cabinet. The drip rail serves to direct dripping grease into either the underlying charcoal pan or burner pan for collection and away from the cabinet side walls. In this way the cabinet is maintained relatively clean thereby reducing the time required to maintain the cabinet in a clean condition for, for example, rental to future users. Preferably, a cooktop rack is received and held within the drip rail. The cooktop rack supports the meat or other food being cooked.

In accordance with yet another aspect of the present invention, the charcoal pan includes a series of vents in the sidewalls thereof. Preferably, the charcoal pan fits within the cabinet with sufficient clearance to provide an airspace between the charcoal pan and the side walls of the cabinet. This arrangement allows air to flow upwardly from beneath the cabinet through the airspace and vents to the burning coals. This arrangement optimizes cooking efficiency. Additionally, means are provided for adjusting the height of the charcoal pan relative to the cooktop to thereby allow cooking temperatures and hence cooking speed to be adjusted as desired.

More specifically, the cabinet includes first and second substantially F-shaped slots in opposing left and right sidewalls thereof. A gas burner assembly receipt aperture is centrally disposed between the F-shaped slots in one of the opposing sidewalls. The gas burner receipt aperture is substantially horizontally aligned with a lowermost portion of each F-shaped slot. Not only does this arrangement allow the conversion of the grill between gas and charcoal firing but it also allows for the height of the charcoal pan relative to the cooktop to be adjusted when charcoal firing is being utilized.

More specifically, the charcoal pan is selectively positionable between uppermost, intermediate, and lowermost positions. In fact, the charcoal pan may be adjusted to slant from one side to another by placing one side in, for example, the uppermost position and the opposite side in the lowermost position. This feature allows the cook to, for example, simultaneously cook meats to selected taste (e.g. well, medium, or rare) in substantially the same amount of cooking time.

It should further be appreciated that the apparatus includes an inwardly extending flange around the entire periphery of a bottom edge of the cabinet. The bottom face of the charcoal pan engages this flange when in the lowermost position thereby cutting off airflow from beneath the cabinet into the airspace provided between the charcoal pan and the cabinet sidewalls. Accordingly, when the charcoal pan is positioned in the lowermost position oxygen is substantially shut off to the charcoal thereby significantly decreasing combustion and dropping the cooking temperature. This feature allows the cook to more quickly control fires that become too hot for best cooking. This is a significant concern in large capacity grills that utilize large amounts of charcoal.

In accordance with yet another aspect of the present invention, the gas burner assembly includes a pan having sidewalls including fresh air inlets and downwardly sloping/inwardly converging bottom walls having spaced grease drain openings. A grease collecting gutter extends beneath the grease drain openings. Preferably, the grease drain gutter is mounted at an angle so as to direct all grease collected into a collection container mounted beneath the cabinet.

Still other objects of the present invention will become readily apparent to those skilled in this art from the following description wherein there is shown and described a preferred embodiment of this invention, simply by way of illustration of one of the modes best suited to carry out the invention. As will be realized, the invention is capable of other different embodiments, and its several details are capable of modifications in various, obvious aspects all without departing from the invention. Accordingly, the drawing and descriptions will be regarded as illustrative and not as restrictive.

BRIEF DESCRIPTION OF THE DRAWING

The accompanying drawing incorporated in and forming a part of the specification, illustrates several aspects of the present invention, and together with the description serves to explain the principals of the invention. In the drawing.

Reference will now be made in detail to the present preferred embodiment of the invention, an example of which is illustrated in the accompanying drawing.

DETAILED DESCRIPTION OF THE INVENTION

Reference is now made to the drawing Figures showing the improved convertible food preparation/holding apparatus 10 of the present invention. As shown in the figures, the apparatus 10 includes a main cabinet 12 formed from four cooperating side walls 14 and having an open top and bottom. The cabinet 12 is supported on four legs 13 so as to present the cooktop rack 15 at a desired height. The legs 13 may each include a castor 17 to allow the apparatus to be easily moved about as desired.

Each side wall 14 of the cabinet 12 includes an upper lip 16 formed from an outwardly extending flange adapted to receive a drip rail 18. More specifically, the drip rail 18 nests within the upper lip 16 so as to be held securely in position. An inwardly extending flange 20 is provided around the entire periphery of the cabinet 12 at the bottom edge of the side walls 14. This flange 20 cooperates with the optional charcoal pan 22 to control air flow in the manner described in greater detail below.

Figure 1:
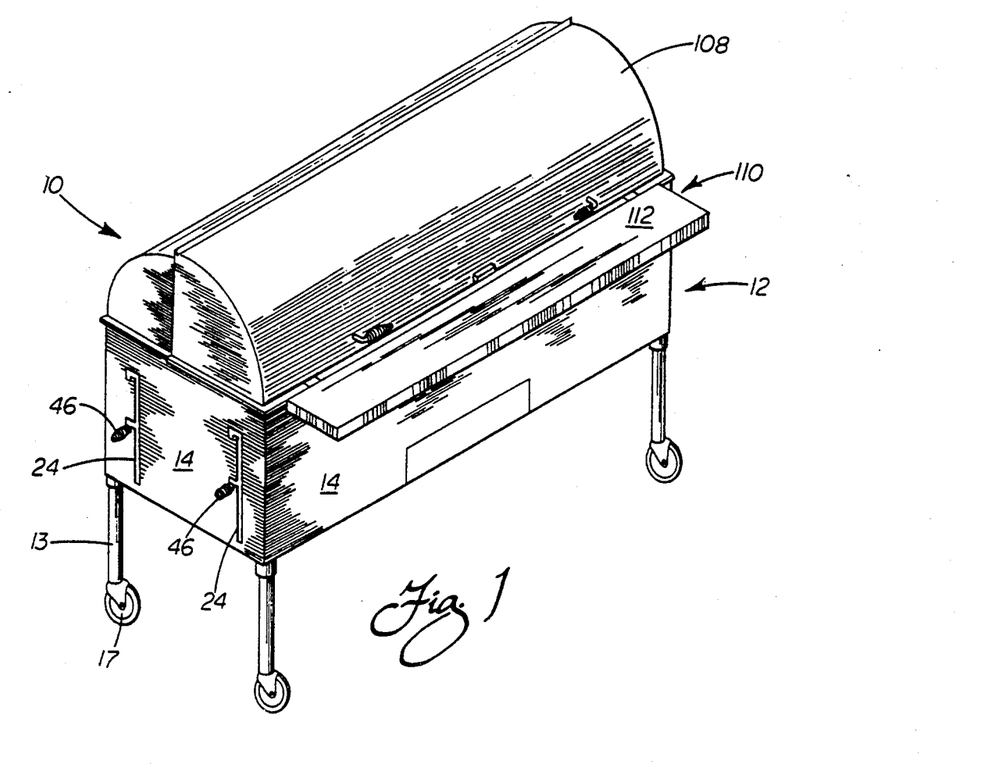
FIG. 1 is a perspective view of the convertible food preparation/holding apparatus of the present invention with the optional hood and shelf in place.
Figure 2A:
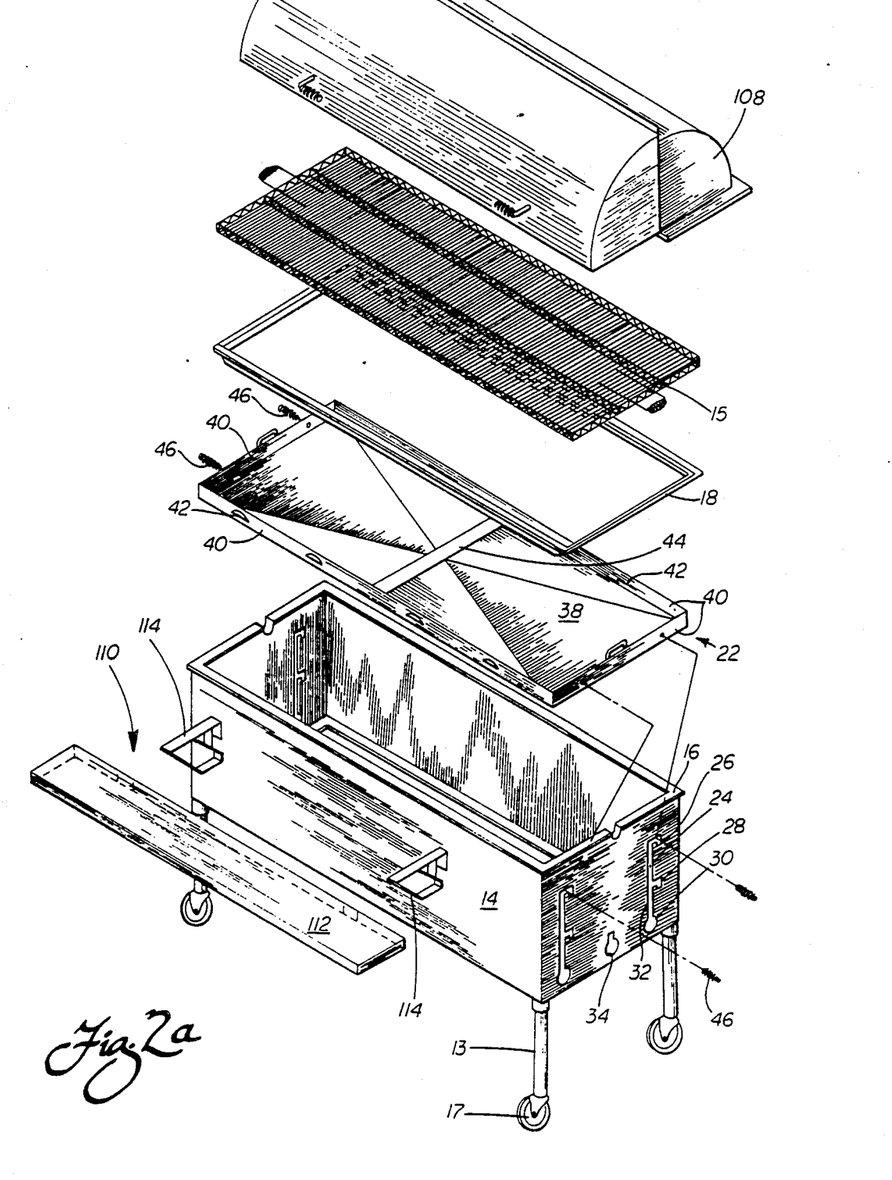
FIG. 2 is an exploded view of the present apparatus showing the interchangeable charcoal pan mode of operation.

As shown best in FIG. 2A, the right hand side wall 14 of the cabinet 12 includes a pair of substantially F- shaped mounting slots 24. Each F-shaped slot 24 consists of an upper horizontal leg and locking notch 26, an intermediate horizontal leg and locking notch 28 and a lowermost enlarged locking notch 30 connected together by a vertically extending guide track 32. The right side wall 14 also includes a gas burner receipt aperture 34 centrally disposed between the F-shaped slots 24. Two additional F-shaped slots 24 are provided in the left side wall 14 (see FIG. 1) in aligned, corresponding relation to the F-shaped slots 24 in the right side wall 14. Together, the F-shaped slots 24 and inwardly directed bottom flange 20 allow the selected mounting of the charcoal pan 22 or a gas burner assembly 36 in the cabinet 12 (see also FIGS. 2B, 3B, 4 and 5).

As best shown in FIG. 2A, the charcoal pan 22 includes a bottom wall 38 and four cooperating side walls 40. As shown also in FIGS. 3A and 3B, the front and rear side walls 40 include vents 42 that allow air to circulate in close proximity to the charcoal held in the pan 22 to provide more efficient burning. If desired, a dividing wall 44 may be provided extending between the front and rear side walls 40 as shown. This wall 44 resists shifting of the charcoal in the pan 22 when the pan is moved into a slanted position such as shown in phantom in FIG. 3A. A pair of spring handles 46 are connected to each of the left and right side walls 40 of the charcoal pan 22. The handles 46 are spaced apart and adapted so as to be received in and extend through the F-shaped mounting slots 24 in the left and right side walls of the cabinet 12 when the charcoal pan 22 is operatively positioned in the cabinet.

More specifically, the handles 46 include threaded rods adapted to screw into the charcoal pan 22. In order to position the charcoal pan 22 in the cabinet 12, the handles 46 are unscrewed and removed from the pan. The pan 22 is then dropped down into the cabinet 12 until the bottom wall 38 of the pan rests upon the inwardly directed flanges 20 at the bottom edge of the cabinet. Once so positioned, the handles 46 are inserted through the enlarged openings 30 at the lowermost end of the F-shaped mounting slots 24 in the cabinet side walls 14. The threaded rods of the handles 46 are then aligned with the threaded openings in the left and right side walls 40 of the pan 22 and rotated clockwise until handtight. When properly positioned, the cool grip spring handles 46 extend outwardly from the sidewalls 14 of the cabinet as shown in FIG. 1 where they may be conveniently manipulated by the cook to raise or lower the height of the charcoal pan as desired (note description of operation below).

The charcoal pan 22 is then moved to the upper most position by sliding the handles 46 along the vertical guide tracks 32 and then shifting them over so as to be received in the upper locking notches 26. Next, the drip rail 18 is nested with the upper lip 16 of the cabinet 12 and charcoal is added to the pan and ignited in a manner known in the art. Once sufficient combustion is evident, the charcoal is spread evenly over the pan 22 and the cooktop rack 15 is positioned so as to nest in the drip rail 18. The meat or other food to be cooked is then placed on the rack 15.

Figure 3A:
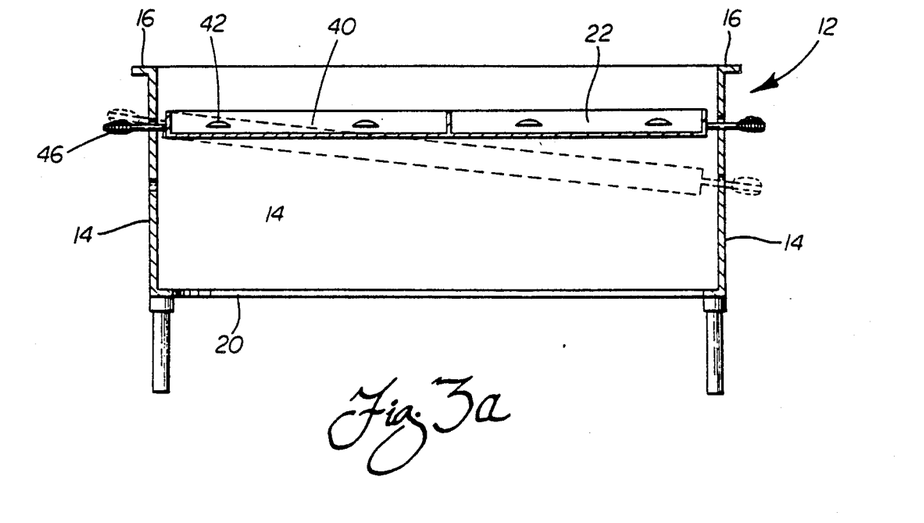
FIG. 3A is a cross-sectional view showing the charcoal pan in the uppermost position (full line) and the slant position (phantom)

In the event the heat thrown by the charcoal is too hot for cooking to the desired level, the charcoal pan 22 may be lowered. Where desired, the pan may in fact be lowered on only one side (as shown in phantom line in FIG. 3). This will allow the cook to have the option of a hot fire, for example, on the left side and a relatively cooler fire on the right side as shown in FIG. 3A. This can aid the cook in cooking, for example, well done steaks on the left and rare steaks on the right in substantially the same cooking time. Of course, if desired, the entire charcoal pan 22 may be lowered to the intermediate or bottom position by simply moving the handles 46 from the upper locking notches 26 into the vertical guide tracks 32 and then repositioning the handles in either the intermediate locking notches 28 or in the lowermost notches 30 as desired. Advantageously, the present system allows one individual to fully control the positioning of the charcoal pan 22 and hence the position of the burning coals relative to the food on the cooktop rack 15. Additionally, this control is provided without the necessity of repositioning the cooktop rack 15. Thus, the food remains undisturbed. In prior art design wherein the height of the cooktop rack is adjustable, the slant cooking discussed above is not always feasible as the positioning of the cooktop rack on a slant can lead to food shifting and, for example, hot dogs rolling from the grill.

Figure 3B:
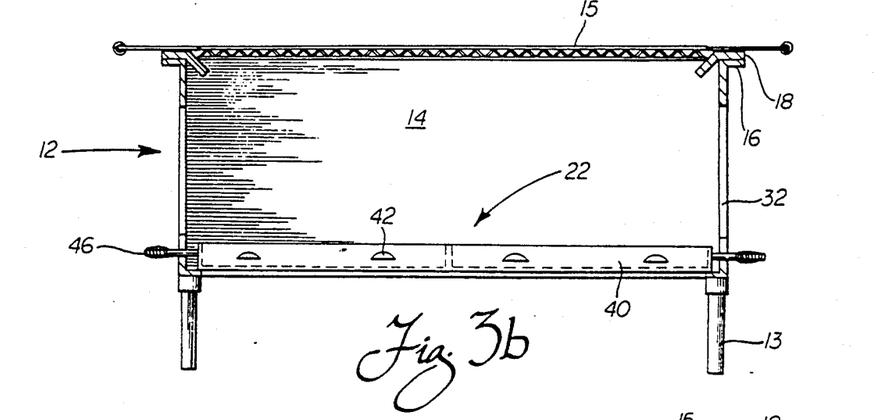
FIG. 3B is a view similar to FIG. 3A but showing the charcoal pan positioned in the lowermost position and resting on the inwardly directed flange at the lower edge of the cabinet.
Figure 3C:
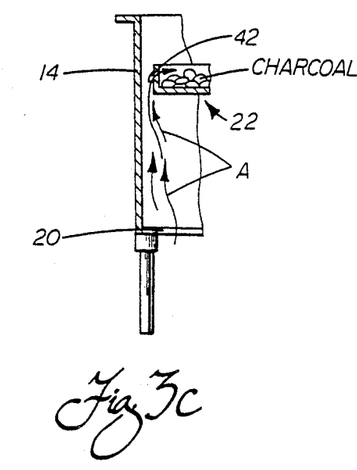
FIG. 3C is a cutaway sectional view showing the airflow through the airspace between the cabinet and the charcoal pan.

As should be appreciated from viewing FIGS. 3B and 3C, the charcoal pan 22 fits within the cabinet 12 with sufficient clearance to provide an airspace between the charcoal pan and all the sidewalls 14 of the cabinet. Accordingly, when the charcoal pan 22 is positioned in either the intermediate or uppermost locking notches 28, 26 respectively, air is drawn (see action arrows A) from beneath the cabinet 12 and upwardly along the airspace (in the manner of a flue to a fireplace) through the vents 42 in the sidewalls 40 of the charcoal pan 22. This continuing air stream pours over the burning coals to provide faster more complete combustion and a hotter fire for more efficient and faster cooking.

In the event, however, that the fire becomes too hot, the apparatus 10 of the present invention includes a unique feature that allows the coals to be cooled in a quick and efficient manner. More particularly, when it is desired to cool the fire, the charcoal pan 22 is moved to its lowermost position with the handles 46 engaging the enlarged openings 30 at the bottom of the F-shaped mounting slots 24. When in this position, the bottom wall 38 of the charcoal pan 22 also engages the inwardly extending flange 20 at the bottom of the cabinet 12. The inwardly extending flange 20 extends all the way around the bottom of the cabinet as does the engagement with the bottom wall 38 of the charcoal pan 22. Accordingly, in this position air flow from beneath the cabinet 12 through the vents 42 to the burning coals is effectively cut off. Accordingly, the resulting oxygen starvation serves to quickly cool the coals. This allows the cook to have a more controlled charcoal fire to insure that the food is always served as desired whether the food is to be cooked well done, medium or rare.

Figure 2B:
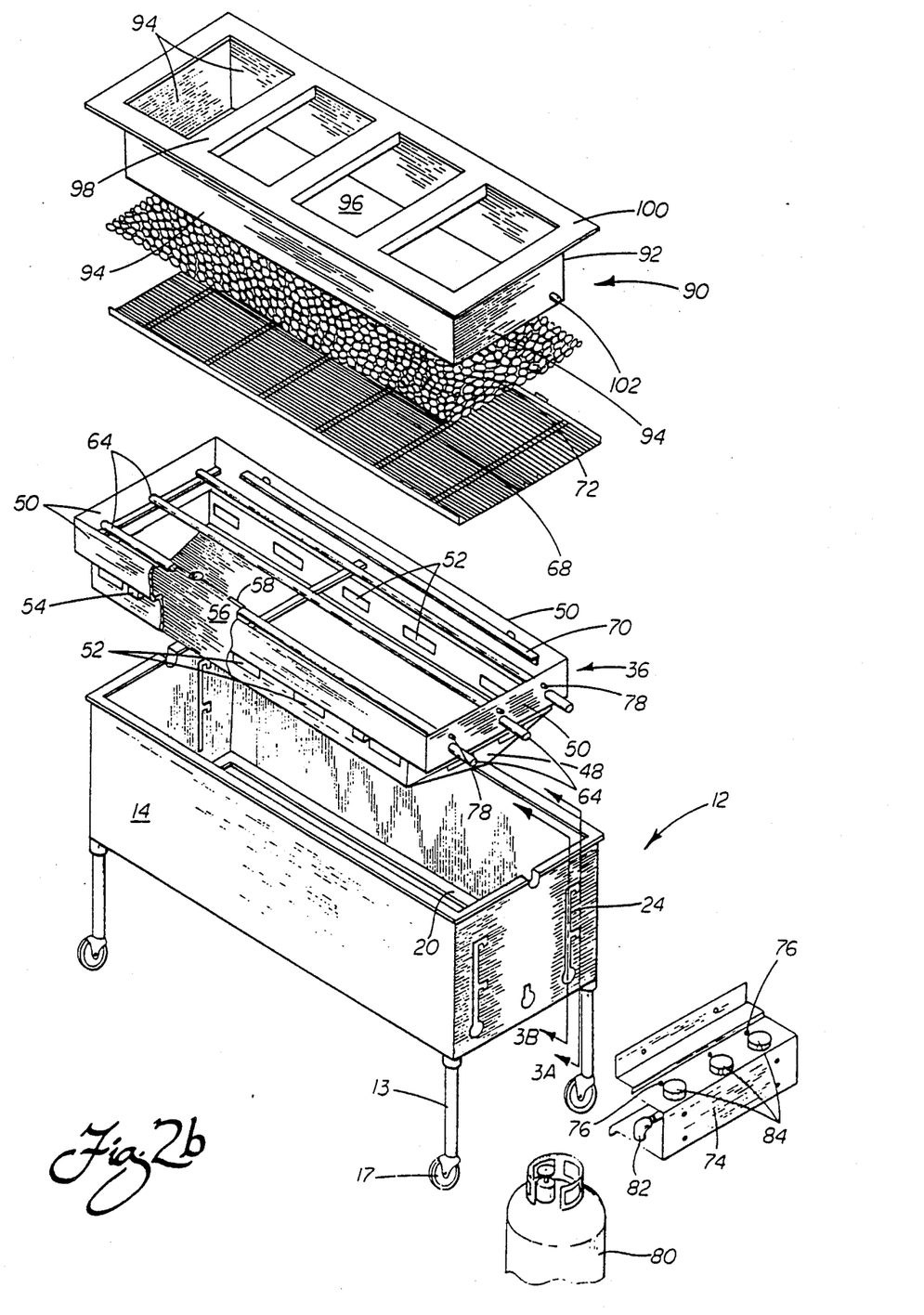
FIG. 2B is an exploded view of the present apparatus showing the interchangeable gas burner assembly and hot/cold serving assembly that may be alternately received in the cabinet to convert the apparatus between various food preparation/holding modes.
Figure 4:
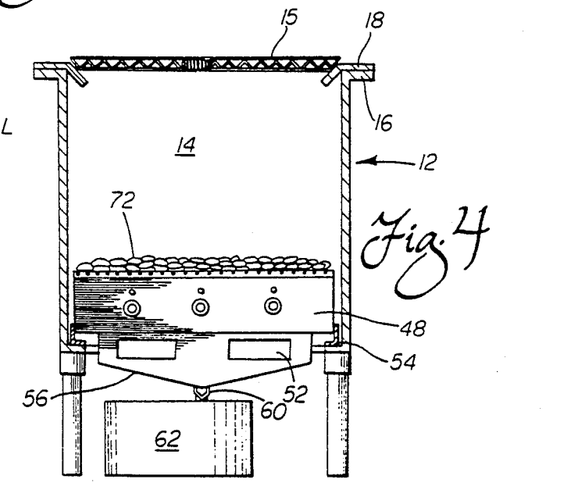
FIG. 4 is a cross-sectional view showing the gas burner assembly in place within the cabinet.
Figure 5:
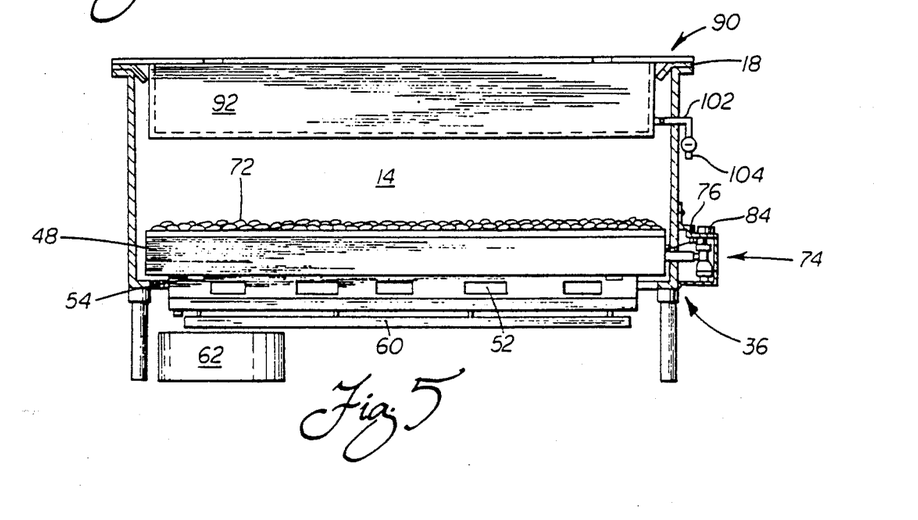
FIG. 5 is a cross-section view showing the hot/cold serving assembly in position in the cabinet.

When desired, the cabinet 12 may be converted for gas firing by positioning the gas burner assembly 36 in the cabinet in place of the charcoal pan 22 (see FIGS. 2B, 4 and 5). The gas burner assembly 36 comprises a burner pan 48 including four cooperating side walls 50 having fresh air inlets 52. Legs 54 attached to the front and rear sidewalls 50 support the gas burner assembly 36 in the cabinet 12 by resting on the inwardly extending flange 20 at the bottom edge of the cabinet sidewalls 14 (see FIG. 4).

As best shown in FIGS. 2B and 4, the gas burner assembly 36 also includes downwardly sloping and inwardly converging bottom walls 56. The bottom walls slope and converge toward grease drain openings 58 so as to direct grease from the burner pan 48 to an underlying grease collecting gutter 60 formed from, for example, angle iron. As shown in FIG. 1, the gutter 60 slopes from left to right so as to direct the collected grease into a collection container 62 for disposal.

Multiple gas pipe burners 64, of a type known in the art, are mounted in the burner pan 48. In the embodiment shown in the drawing, three pipe burners 64 are provided. When placing the gas burner assembly 36 in the cabinet 12, the drip rail 18, cooktop rack 15 and charcoal pan 22 are removed. The pan 48 is then lowered down into the cabinet 12 until the legs 54 rest on the lower inwardly directed flange 20 of the cabinet sidewalls 14. The proximal end of the pipe burners 64 extending through the right hand side wall 50 of the burner pan 48 are then extended through the lowermost apertures 30 in the F-shaped mounting slots 24 and the centrally disposed gas burner assembly receipt aperture 34 in the right hand side wall 14 of the cabinet 12.

A rock rack 68 is then positioned so as to rest on the support brackets 70 mounted to the front and rear sidewalls 50 of the burner pan 48 so that the rack extends over the pipe burners 64. Next, lava rocks 72 are spread evenly over the rock rack 68 in a manner known in the art. Finally, the gas burner control panel 74 is mounted to the right hand side wall 14 of the cabinet 12 by means of threaded studs and nuts or other appropriate fastening means. When properly position, burner orifices in the control assembly 74 are received within the pipe burner 64. Additionally, igniter buttons 76 on the control assembly 74 are connected to electrodes 78 extending into the burner pan 48 for burner ignition. Finally, a propane gas supply 80 is connected to the gas inlet and manifold 82 of the control assembly 74. Once connected and ignited, the cooking temperature may be controlled by manipulation of the individual burner controls 84 on the control assembly 74 in a manner known in the art.

It should also be appreciated that the apparatus 10 may also function in a hot/cold serving table mode. More particularly, as shown in FIGS. 2B and 5, the apparatus 10 includes a hot/cold serving assembly 90 including a box 92 having four sidewalls 94 and a bottom wall 96 sealed together. A series of cross rails 98 extend across the upper opening of the box 92. As is known in the art, holding pans (not shown) are received between the cross rails 98 and the outwardly extending upper lip 100 of the assembly 90. A drain pipe 102 extends from one corner of the box 92.

The hot and cold serving assembly 90 may be positioned in the main cabinet 12 overlying either the charcoal pan 22 or the gas burner assembly 36. More particularly, the cooktop rack is removed from the drip rail 18 and the box 92 of the hot/cold serving assembly is dropped into position with the upper lip 100 engaging and nesting in the drip rail 18. A pipe extension and cutoff valve assembly 104 is then inserted through one of the F-shaped mounting slots in the side wall 14 of the cabinet 12. The pipe extension of the assembly 104 threadedly engages the drain pipe 102 mounted to the box 92. The assembly 104 is hand tightened and the cutoff valve closed.

When operation as a hot serving table is desired, approximately two inches of water is placed in the box 92. One or more of the burners 64 is then ignited to heat the water. Appropriate steam holding pans as are known in the art are then positioned between the cross rails 98 and the upper lip 100 of the hot/cold serving assembly 90. Food may be maintained piping hot in these pans for an extended period of time.

When a cold serving table is desired, the box 92 is filled with ice and, once again, appropriate holding pans are positioned in the hot/cold serving assembly 90 so as to hold the food over the ice and maintain it cold for an extended period of time.

Whether used as a hot or cold serving table, water is drained from the box 92 through the cutoff valve of the drain assembly 104 when the hot or cold serving table function is no longer required.

Advantageously, the apparatus 10 of the present invention is also adapted to include other convenience features. For example, a retractable hood 108, of a type known in the art, may be mounted to the upper lip 16 of the main cabinet 12 (see FIGS. 1 and 2A). The hood 108 is designed to be used with either the gas burner assembly 36 or the charcoal pan 22 with either a meat rack or an optional rotisserie. The hood 108 functions to reflect and hold heat thereby conserving fuel and decreasing cooking time while adding additional smoke flavor to meats being cooked.

The apparatus 10 may also include an optional shelf assembly 110 (again see FIGS. 1 and 2A) including a shelf 112 mounted to brackets 114 that hook over the upper edge of a sidewall 14 of the main cabinet 12 to hold the shelf 112 in position. If desired, nuts and bolts may be used to mount the shelf assembly 110 to the cabinet 12. Additionally, it should be appreciated that a shelf assembly 110 may be mounted along either or both of the front and rear side walls 14 of the cabinet (note mounting of shelf on the front wall of the cabinet in FIG. 1). This shelf, of course, provides a convenient area upon which to place utensils during cooking, or for example, condiments and eating utensils when the apparatus 10 is utilized in the hot/cold serving table mode.

As indicated above, the apparatus 10 is also adapted for utilization with an optional rotisserie (not shown). More particularly, the upper lip of the left and right side walls 14 of the cabinet 12 include notches or saddles for the receipt of a spit. Similar saddles are provided in the drip rail 18. The spit may, of course, be powered by a motor as is known in the art so as to reciprocate meat received thereon for even cooking. Accordingly, a motor assembly may be mounted to the left side wall 14 of the cabinet 12 by means of bolts so as to be held securely in position.

Advantageously, when utilizing the rotisserie, either propane gas or charcoal firing may be used. Further, it should be appreciated that the cabinet 12 has sufficiently high side walls 14 that effectively act as windguards so as to maintain the heat around the meat cooking on the spit. In fact, the rotisserie may be utilized and efficient cooking may be completed even without the retractable hood 108 in position.

Due to the unique versatile design of the apparatus 10 of the present invention, it is now possible for an individual to own a charcoal fired grill, a gas fired grill and a hot/cold serving table with a minimum investment. Further, the unit may be purchased as a relatively inexpensive charcoal grill initially and the more expensive gas burner assembly and/or the hot/cold serving assembly can be subsequently purchased to increase the utility of the apparatus 10 when additional capital is available.

It should also be appreciated that the apparatus 10 is relatively inexpensive to operate while providing a long service life. More particularly, the airspace between the charcoal pan 22/burner pan 48 and the sidewalls 14 of the cabinet 12 insures that the cabinet 12 remains at a somewhat cooler temperature. This aids in paint retention on the cabinet and furthers the cabinet's service life. Advantageously, the slightly cooler sidewalls also reduce the risk of inadvertent burn injury providing the individual with a fraction of a second of additional time to remove, for example, a hand from contact with a sidewall 14 before a burn occurs.

Further, it should be appreciated that the individual components of this assembly may be replaced as necessary without replacing the other components. Thus, for example, in the event the charcoal pan 22 burns through, a new and relatively inexpensive charcoal pan 22 may be purchased to replace the original. There is no need to replace any other components of the apparatus 10 including the cabinet 12. Accordingly, repair costs to maintain the operation of the apparatus 10 are significantly reduced.

In summary, numerous benefits result from employing the concepts of the present invention. The uniquely versatile apparatus 10 provides a charcoal fired grill, gas fired grill and hot/cold serving table with a minimum capital investment. The apparatus is readily convertible between any of these modes of operation. The apparatus 10 also provides a unique means for controlling the temperature of the fire when cooking with charcoal through selective placement of the charcoal pan in uppermost, intermediate and lowermost positions relative to the cooktop rack holding the food being cooked. Advantageously, in the lowermost position, airflow to the charcoal is cut off to quickly cause the coals to cool in the manner desired for maximum temperature control. Additionally, it should be appreciated that the charcoal pan 22 may be slanted relative to the cooktop rack while meat on the rack stays flat and stationary. In this way cooking temperatures may be varied across the meat rack but the food on the rack is left undisturbed by the adjustment.

The foregoing description of the preferred embodiment of the invention has been presented for purposes of illustration and description. It is not intended to be exhaustive or to limit the invention to the precise form disclosed. Obvious modifications or variations are possible in light of the above teachings. The preferred embodiment was chosen and described to provide the best illustration of the principals of the invention and its practical application to thereby enable one of ordinary skill in the art to utilize the invention in various embodiments and with various modifications as are suited to the particular use contemplated. All such modification and variations are within the scope of the invention as determined by the appended claims when interpreted in accordance with the breadth to which they are fairly, legally and equitably entitled.

I claim:

1. A convertible food preparation/holding apparatus, comprising:
    a cabinet;
    interchangeable heating means selected from a group consisting of a charcoal pan and a gas burner assembly;
    means for selectively mounting said interchangeable heating means in said cabinet;
    a drip rail received in said cabinet that rests on an upper lip thereof, said drip rail extending inwardly from said sidewalls of said cabinet so as to substantially prevent drippings from engaging the interior of said cabinet sidewalls; and
    a cooktop rack mounted on said drip rail.

2. The convertible food preparation/holding apparatus as set forth in claim 1, further including hood means for mounting on said cabinet, said hood means being displaceable between an open position allowing access to the interior of said cabinet and a closed position sealing a top of the cabinet.

3. The convertible food preparation/holding apparatus as set forth in claim 1, further including leg means for supporting said cabinet on said ground.

4. The convertible food preparation/holding apparatus as set forth in claim 1, further including shelf means for mounting to said cabinet.

5. The convertible food preparation/holding apparatus as set forth in claim 1, wherein said interchangeable heating means selected is said charcoal pan and said charcoal pan further includes vent means in sidewalls of said charcoal pan.

6. The convertible food preparation/holding apparatus as set forth in claim 5, wherein said charcoal pan fits within said cabinet with sufficient clearance to provide an airspace between said charcoal pan and sidewalls of said cabinet.

7. The convertible food preparation/holding apparatus as set forth in claim 6, wherein said selective mounting means includes means for adjusting the height of said charcoal pan relative to said cook top.

8. The convertible food preparation/holding apparatus set forth in claim 7, wherein said height adjusting means includes a pair of F-shaped slots in opposing sidewalls of said cabinet and a pair of cooperating handles in opposing sidewalls of said charcoal pan extending through and engaging in said slots.

9. The convertible food preparation/holding apparatus as set forth in claim 1, wherein said mounting means includes a pair of F-shaped slots in opposing sidewalls of said cabinet.

10. The convertible food preparation/holding apparatus set forth in claim 9, further including a gas burner assembly receipt aperture between said pair of F-shaped slots in one of said opposing sidewalls.

11. The convertible food preparation/holding apparatus set forth in claim 10, wherein said gas burner assembly receipt aperture is substantially horizontally aligned with a lowermost portion of each substantially F-shaped slot.

12. The convertible food preparation/holding apparatus as set forth in claim 1, wherein said interchangeable heating means comprises a gas burner assembly and said gas burner assembly includes a burner pan having sidewalls including fresh air inlets and downwardly sloping/inwardly converging bottom walls having spaced grease drain openings.

13. The convertible food preparation/holding apparatus set forth in claim 12, further including a grease drain gutter extending beneath said grease drain openings in said burner pan.

14. A convertible food preparation/holding apparatus, comprising:
    a cabinet;
    a charcoal pan having sidewalls and vent means in said sidewalls for the passage of air;
    a cooktop rack for supporting food to be cooked over said charcoal pan;
    means for mounting said charcoal pan in said cabinet including means for adjusting the height of said charcoal pan relative to said cooktop rack; and
    wherein said charcoal pan fits within said cabinet with sufficient clearance to provide an air space between said charcoal pan and sidewalls of said cabinet and further including;

a lowermost position for said charcoal pan and an inwardly extending flange around the entire periphery of a bottom edge of said cabinet; said charcoal pan engaging said flange when in said lowermost position thereby cutting off air flow from beneath said cabinet into said air space between said charcoal pan and cabinet sidewalls.

* * * * *